Patented July 11, 1950

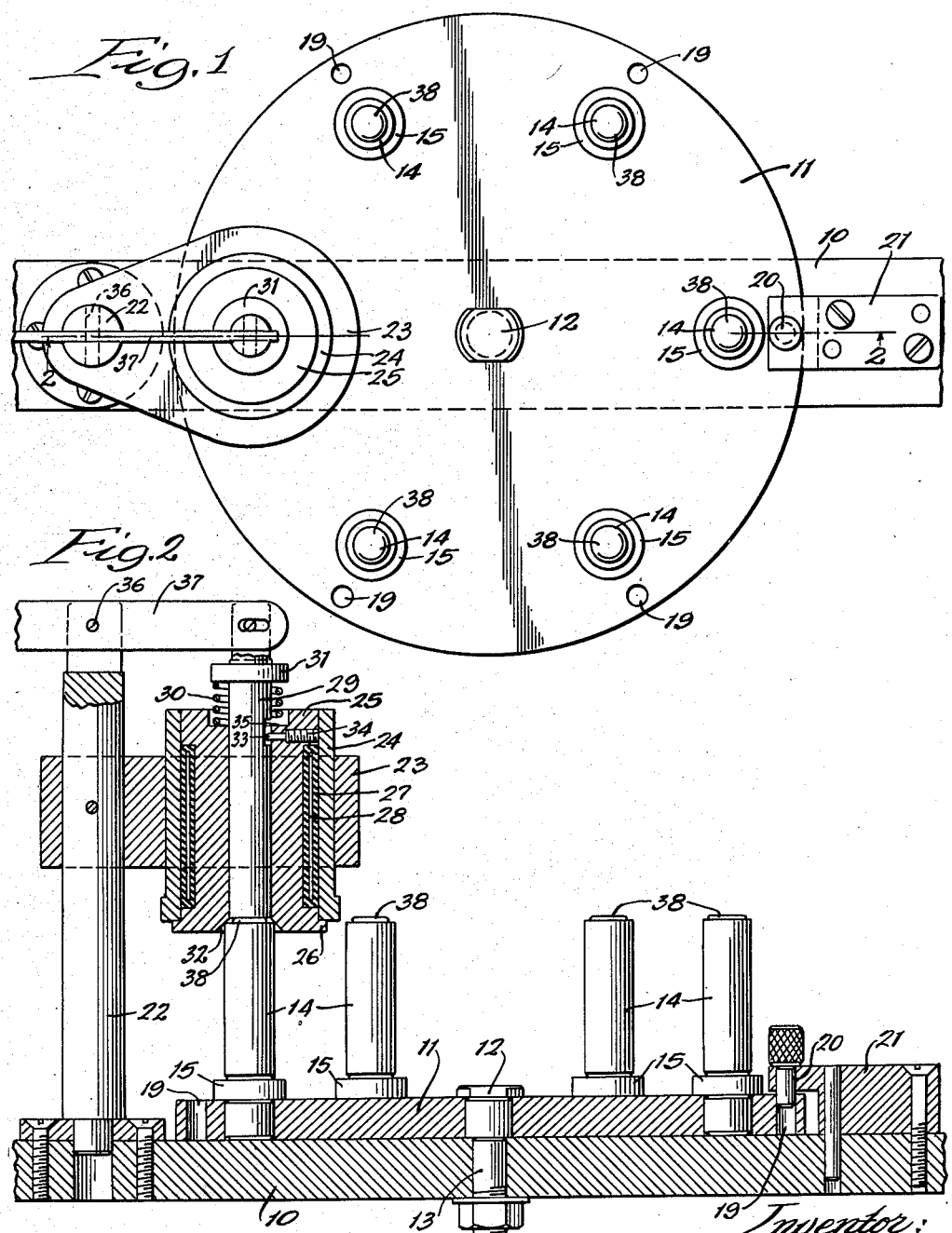

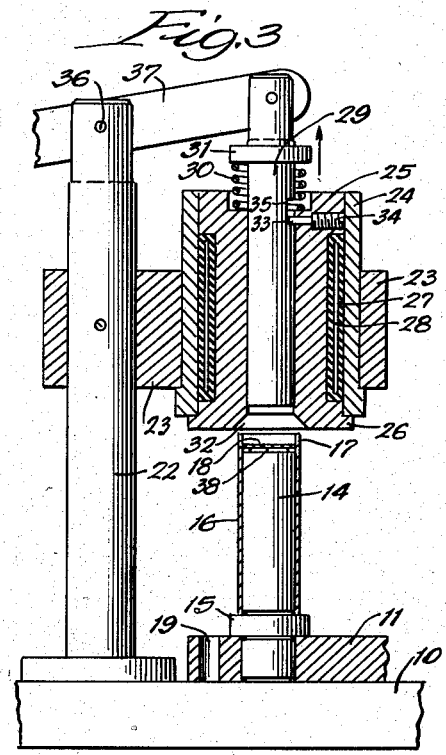
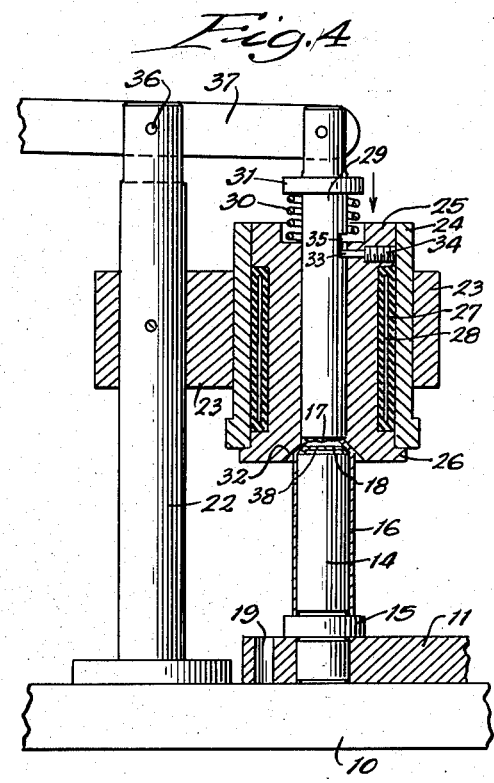
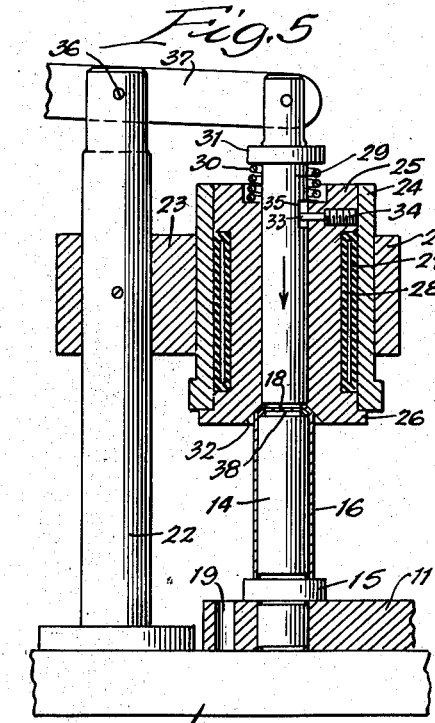
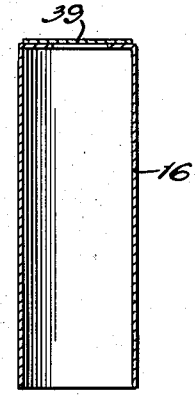

2,514,937

UNITED STATES PATENT OFFICE 2,514,937

CONTAINER FORMING APPARATUS

Fred V. Collins, Des Plaines, Ill., assignor to William F. Stahl, Kenilworth, Ill.

Application January 10, 1947, Serial No. 721,270

1 Claim. (Cl. 18—19)

This invention relates to a container forming apparatus and is particularly useful in the forming of such products from tubular fusible stock.

It is common practice today to form tubes from plastic material such as cellulose acetate, vinyl acetate, vinyl chloride (co-polymer) and from a variety of other materials which are of a fusible character. It is desired to form from such available tubular products containers, enclosures, bobbins, and a variety of other products in an inexpensive and effective manner and through the use of very simple mechanical means and process steps.

An object of the present invention is to provide a means for rapidly producing products from tubular fusible plastic material, and in conjunction with fusible discs or caps. Yet another object is to provide a means for producing tubes closed at one end or at both ends and useful as containers, enclosures, or caps for bottles, and for a great variety of other uses. Yet another object is to provide means for the integration of plastic discs with plastic tubes whereby a substantially uniform container, closed at least at one end, is obtained. Other specific objects and advantages will appear as the specification proceeds.

The invention is illustrated, in simple embodiments, by the accompanying drawings, in which—

Fig. 1 is a top plan view of apparatus embodying my invention; Fig. 2, a vertical sectional view, the section being taken as indicated at line 2 of Fig. 1; Fig. 3, a broken sectional detail view showing the forming mechanism in raised position; Fig. 4, a view similar to Fig. 3 but showing the forming mechanism in partially lowered position; Fig. 5, a view similar to Fig. 4 but showing the final step in the closure operation; Fig. 6, a longitudinal sectional view of a tube closed in accordance with the apparatus shown in Figs. 1 to 5, inclusive; and Fig. 7, a sectional view of a modified form of tube closure embodying my invention.

In the illustration given, 10 designates a plate or base supported by any suitable frame, etc. Upon the base plate 10 is rotatably supported a carrier plate 11. The carrier plate is centrally apertured to receive the elongated head 12 of the bolt 13.

Mounted upon the rotatable plate 11 at spaced distances along the outer edge portion thereof are the mandrels 14. Each mandrel has a lower portion received within a recess of the plate 11 and is provided with a base flange 15. The mandrel is adapted to receive a plastic tube 16 with a free portion 17 of the tube extending above the mandrel. The lower portion of the tube rests against the base collar 15, as shown more clearly in Figs. 3, 4 and 5. The mandrel 14 is also adapted to receive on its upper surface a disc 18 of plastic fusible material.

The rotatable plate 11 is preferably provided adjacent each of the mandrels with a locking recess 19 adapted to be engaged by a latch plunger 20 slidably mounted in the bracket 21.

Any suitable means for turning the free end portion 17 of the tube 16 inwardly, and fusing the same to the disc 18, may be employed. In the illustration given, I provide the base 10 with a standard 22 to which is secured centrally a supporting arm 23. The supporting arm 23 slidably receives a tubular casing member 24 provided centrally with the die member 25. The die member 25 is provided at its lower end with a laterally extending flange 26 engaging and supporting the casing member 24. The member 25 is recessed at 27 to receive a heating element 28 of any suitable type. For example, an electric resistance element of Nichrome metal may be employed and heated by the passing of an electric current therethrough. If desired, instead of passing an electric current through the structure 28, the entire die structure 25 may be employed as an electronic foot and connected with a high frequency radio wave generator so that the structure 25 will subject the fusible material there below to the action of high frequency radio waves.

The member 25 is centrally apertured to receive a plunger 29 normally urged upwardly by a spring 30. The spring 30 is received within a recess at the upper end of the die 25 and bears against a collar 31 of the plunger 29.

The die 25 is provided on its under side with an inclined or bevelled surface 32 adapted to engage the upper free edge portion 17 of the plastic tube 16 and to force the same inwardly. The die 25 and sleeve 24 are supported upon the plunger die 29 by means of a pin 33. The pin 33 is provided with a head 34 threadedly engaging a recess in the die member 25 and the pin 33 extends into a longitudinal recess 35 in the plunger die 29. Thus, when the plunger die 29 is raised, it engages the pin 33 and thereby raises the die 25 and sleeve 24.

Any suitable means for operating the plunger 29 may be employed. In the illustration given, the standard 22 is provided with a pivot pin 36 pivotally supporting an operating lever 37. The lever 37 may be operated by hand or by any suitable power means.

The mandrel 14 may have a flat top surface or, as indicated in Figs. 1 to 5, a surface with a slightly raised central portion 38. It will be understood that any suitable die surface may be employed for giving the finished product the desired contour at the bottom or closed end of the tube.

Operation

In the operation of the device, a plastic tube 16 of any suitable fusible material, is placed upon each of the mandrels 14 and the plate 11 may be rotated to bring each mandrel successively into alignment with the die member 25. In the operation illustrated, the plastic cap or disc 18 is placed into each tube 16 prior to the closing operation. Referring now to the mandrel directly below the plunger die 29, the first operation is that illustrated in Fig. 4. Here the inclined walls 32 of the die 25 are brought into engagement with the free end portion 17 of the tube 16 and direct this portion of the tube inwardly while at the same time subjecting this portion of the tube to the action of heat. The heat and pressure thus applied tends to erase any folding of the tube and to cause the end portion of the tube to flow into a substantially smooth flange, as indicated in Fig. 4. At the same time, the disc 18 is buckled upwardly along its center, the ends of the disc being turned downwardly. The above operation was produced by the movement of the lever 37 so as to depress the die plunger 29. In this operation, the spring 30 remains substantially uncompressed and the only effective die operation is that of the inclined or bevelled edge 32 of the die 25.

Continued lowering of the plunger 29, as indicated in Fig. 5, causes the spring 30 to be compressed, as the die 25 meets resistance from the tube 16 and mandrel 14, and the die plunger 29 moves downwardly into engagement with the top portion 17 of the tube 16.

During the above die operations, heat is supplied through an electric current to the electric resistance element 28. If the die members 25 and 29 are employed as an electronic foot, the energy supplied thereto from the generator is in the nature of high frequency radio waves. In either event, heat is supplied to the inwardly turned end portions 17 of the tube 16 and to the cap or disc 18. The results of the fusing operation integrates the structure to provide a closed tube as illustrated in Fig. 6.

In the foregoing described operation, the fusible disc 18 was carried upon the top of mandrel 14 and within the tube 16. It will be understood that the disc 18 may be applied to the outer side of the inwardly turned tube end 17 and fused therewith to form the structure illustrated in Fig. 7. In the latter operation, the end of the tube is preferably folded inwardly first and after the folding operation, the disc 39 is placed upon the inwardly turned edges of the tube and fused therewith by the application of heat and pressure or through the action of high frequency radio waves.

As described more fully in my co-pending application, Serial No. 651,642, now Patent No. 2,504,500, for Tube Forming Apparatus, any metal body or die structure may be employed as an electronic foot and the high frequency radio waves supplied thereto from any radio frequency wave generator. A relatively wide range of frequencies may be employed in bringing about the fusing operation, depending upon the type of material being united, its thickness, power factor, and dielectric strength, etc. I have used frequencies of 200 megacycles effectively in the uniting of cellulose acetate, vinyl acetate, etc., in the usual tube and disc thicknesses.

After the end of the tube has been closed, as described, the lever 37 may be actuated to raise the plunger 29 and in this operation the plunger 29 engages the pin 33 and raises the structures 25 and 24, as illustrated best in Fig. 3. Plate 11 may be rotated one step to free the finished tube 16 for removal and for bringing the next tube and disc into engagement with the die apparatus.

While I have, in the illustration given, shown a single die mechanism for sealing the end of the tube in a two-step operation, it will be understood that other die means may be supported in alignment with other mandrels so that the same tube may be successively subjected to three or more die operations. It will be understood that any suitable mechanism for rotating the plate 11 and for locking it intermittently at its operative positions with respect to the die apparatus, may be employed.

The dimensions of the electronic foot assembly vary in tolerance according to the frequency output and termination impedance of the associated generator. This eliminates the necessity of having to use a terminator and matching impedance network which would have to be adjusted each time frequency is shifted.

While in the foregoing specification I have set out one embodiment of the invention in great detail for the purpose of illustrating the invention, it will be understood that such details may be varied widely by those skilled in the art without departing from the spirit of my invention.

I claim:

In apparatus for forming from fusible plastic stock a tube closed at one end, a base, an upright mandrel carried thereon adapted to support a plastic tube with a free end portion extending beyond the mandrel and adapted also to support upon its top a fusible disc, an upright supporting frame mounted on the base adjacent the mandrel, a hollow cylindrical die member slidably supported on said upright frame in position for co-operation with the upright surface of the mandrel, said die being provided with a beveled face adjacent the mandrel, a cylindrical plunger slidably mounted within and coaxial with said hollow die member, means coupling the die and plunger together to allow a limited range of axial motion therebetween, spring means interposed between the plunger and die operative to maintain the plunger normally in maximum upward position relative to the die, lever means coupled to the plunger operable to depress the plunger and die toward the mandrel whereby the die first engages the free end of the tube and directs the same inwardly and thereafter upon compression of the spring means the plunger presses said inwardly turned end portion against said disc and mandrel, and means for heating the free end of the tube and the disc as they are engaged by the die and plunger.

FRED V. COLLINS.

REFERENCES CITED

The following references are of record in the file of this patent:

UNITED STATES PATENTS

| Number | Name | Date |
|---|---|---|
| 941,085 | Marthinson | Nov. 23, 1909 |
| 1,107,506 | Farmer | Aug. 18, 1914 |
| 1,175,406 | Bohlman | Mar. 14, 1916 |
| 1,352,170 | Boyer | Sept. 7, 1920 |
| 1,520,996 | Bastian | Dec. 30, 1924 |
| 1,660,411 | Bodor | Feb. 28, 1928 |
| 1,754,496 | Barker | Apr. 15, 1930 |
| 2,076,796 | Steinberger et al. | Apr. 13, 1937 |
| 2,125,316 | Ronci | Aug. 2, 1938 |
| 2,169,315 | Yngve | Aug. 15, 1939 |
| 2,259,508 | Abramson | Oct. 21, 1941 |
| 2,341,617 | Hull | Feb. 15, 1944 |
| 2,354,714 | Strickland | Aug. 1, 1944 |